US 7,426,542 B2

(12) United States Patent
Rothman et al.

(10) Patent No.: US 7,426,542 B2
(45) Date of Patent: Sep. 16, 2008

(54) PROVIDING A REMOTE TERMINAL CAPABILITY

(75) Inventors: Michael A. Rothman, Puyallup, WA (US); Vincent J. Zimmer, Federal Way, WA (US)

(73) Assignee: Intel Corporation, Santa Clara, CA (US)

( * ) Notice: Subject to any disclaimer, the term of this patent is extended or adjusted under 35 U.S.C. 154(b) by 674 days.

(21) Appl. No.: 10/879,321

(22) Filed: Jun. 29, 2004

(65) Prior Publication Data

US 2005/0289403 A1 Dec. 29, 2005

(51) Int. Cl.
*G06F 15/16* (2006.01)
(52) U.S. Cl. ...................................... 709/208
(58) Field of Classification Search ................ 345/1.1, 345/2.1; 713/2; 709/222, 208, 223–226; 710/73
See application file for complete search history.

(56) References Cited

U.S. PATENT DOCUMENTS

| | | |
|---|---|---|
| 6,672,896 B1 | 1/2004 | Li |
| 6,697,905 B1 * | 2/2004 | Bealkowski ............... 710/316 |
| 2003/0084133 A1 * | 5/2003 | Chan et al. ................ 709/222 |
| 2003/0088655 A1 * | 5/2003 | Leigh et al. ............... 709/223 |
| 2004/0073637 A1 * | 4/2004 | Larson et al. ............. 709/222 |
| 2004/0221151 A1 * | 11/2004 | Kajita ........................... 713/2 |
| 2004/0222944 A1 * | 11/2004 | Sivertsen .................... 345/1.1 |
| 2005/0125519 A1 * | 6/2005 | Yang et al. ................. 709/223 |

FOREIGN PATENT DOCUMENTS

WO    WO 00/68813 A1 * 11/2000

OTHER PUBLICATIONS

Schonbord, Thomas, "Disable Keyboard and Pointer," RealVNC Newsgroup post, http://realvnc.com/pipermail/vnc-list/2001-April/022051.html.*
"Terminal Services Features," Oct. 28, 1999. Retrieved Jun. 16, 2004, from http://www.microsoft.com/windows2000/server/evaluation/features/terminal.asp.
Bernstein, Robert et al., "KVM Over IP: A New Approach to Server Management," *Dell Power Solutions*, Aug. 2002. Retrieved Jun. 15, 2004, from http://www1.us.dell.com/content/topics/global.aspx/power/en/form_contact?c=us&cs=555&l=en&s=biz.

* cited by examiner

*Primary Examiner*—Scott Baderman
*Assistant Examiner*—Kevin D Scarbery
(74) *Attorney, Agent, or Firm*—Blakely, Sokoloff, Taylor & Zafman LLP (57) ABSTRACT

A method, system and article of manufacture to provide a remote terminal capability. A local system is initialized, the local system including a Keyboard-Video-Mouse (KVM) and a local controller. The local controller is initialized for KVM functionality. A request is sent to a target system to active KVM functionality at the target system, the target system communicatively coupled to the local system. KVM input/output (I/O) traffic is passed between the KVM and the target system via the local controller.

26 Claims, 8 Drawing Sheets

PROVIDING A REMOTE TERMINAL CAPABILITY

BACKGROUND

1. Field

Embodiments of the invention relate to the field of computer systems and more specifically, but not exclusively, to providing a remote terminal capability.

2. Background Information

A Keyboard-Video-Mouse (KVM) switch is used to switch between multiple computers and a single keyboard, monitor and mouse. A KVM switch is a separate device from the computer system and prevents the waste of space needed for several keyboards, monitors and mice. KVM switches may also be used to access multiple servers grouped in a server rack.

Several KVM switches may be needed to support a network in a corporate environment. A typical KVM switch has 16 ports and may cost upwards of $1500. Often, server racks may contain over 80 servers. Thus, purchasing and maintaining numerous KVM switches to support a single server rack is costly. Further, many KVM switches are limited by physical wiring to a server rack.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION

In the following description, numerous specific details are set forth to provide a thorough understanding of embodiments of the invention. One skilled in the relevant art will recognize, however, that embodiments of the invention can be practiced without one or more of the specific details, or with other methods, components, materials, etc. In other instances, well-known structures, materials, or operations are not shown or described in detail to avoid obscuring understanding of this description.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
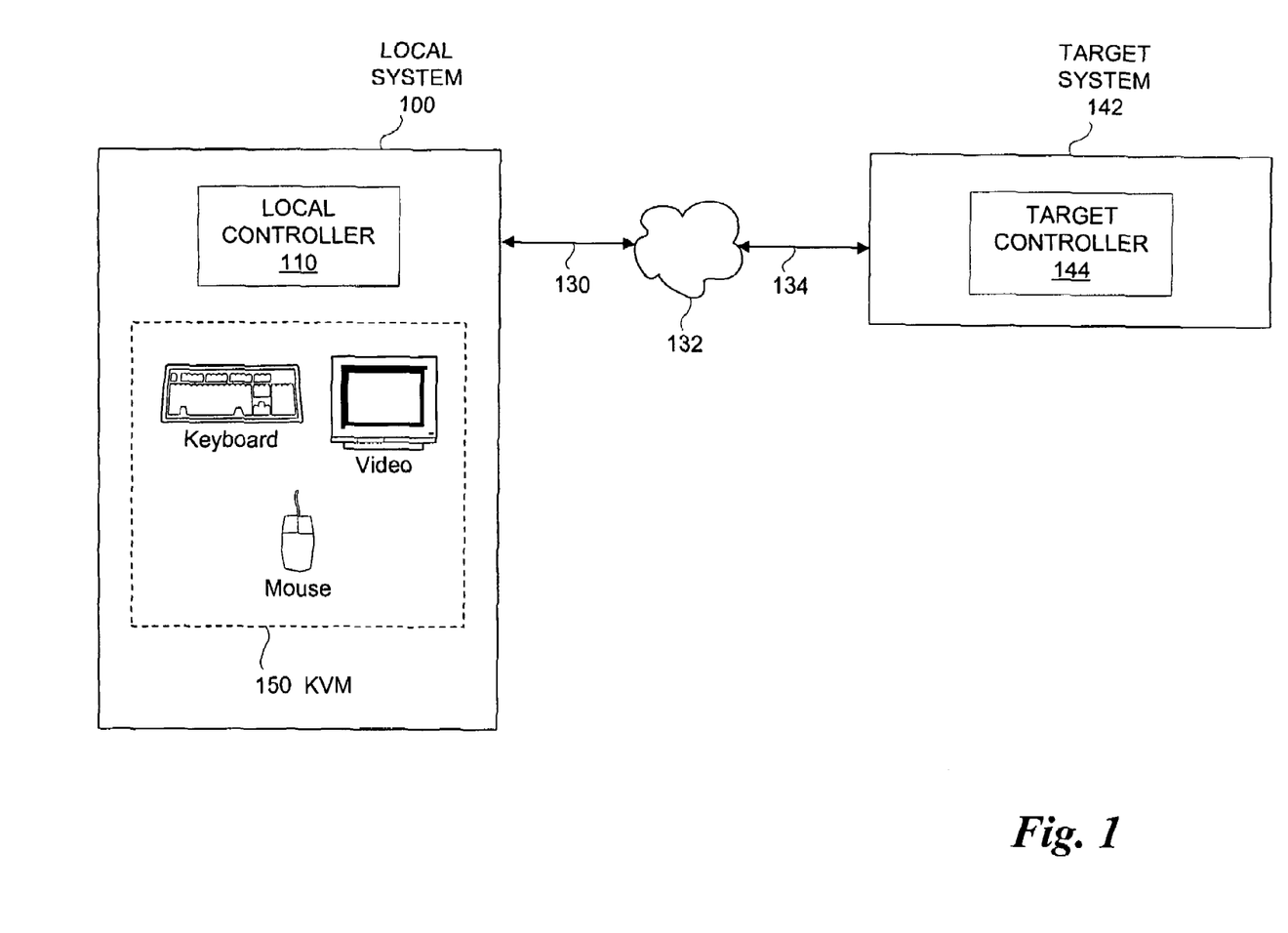
FIG. 1 is a block diagram illustrating one embodiment of an environment to provide a remote terminal capability in accordance with the teachings of the present invention.

Referring to FIG. 1, one embodiment of an environment to support remote terminal capability is shown. A local system 100 is communicatively coupled to a target system 142 over network 132. Local system 100 includes a local controller 110 operatively coupled to a Keyboard-Video-Mouse (KVM) 150. Target system 142 includes a target controller 144.

KVM 150 includes a keyboard, a video monitor, and a mouse coupled to local system 100. The keyboard of KVM 150 may include a touchscreen, a keypad, or the like. The video monitor of KVM 150 may include a cathode-ray-tube (CRT) monitor, a liquid crystal display (LCD), or other display devices for displaying information to a user. The mouse of KVM 150 may include other pointing devices such as a trackball, a trackpad, or the like.

Local system 100 is communicatively coupled to network 132 by connection 130; target system 142 is coupled to network 132 by connection 134. Connections 130 and 134 include connections that are wired, wireless, or any combination thereof. Network 132 includes a Local Area Network (LAN), an intranet, the Internet, or the like. In an alternative embodiment, local system 100 and target system 142 are communicatively coupled over a direct wired or wireless connection without intervening network 132.

In one embodiment, target system 142 may be accessed and controlled remotely from KVM 150 over network 132. Local controller 110 and target controller 144 each include network resources for communicating over network 132. KVM input/output (I/O) traffic associated with KVM 150 and target system 142 may be passed between KVM 150 and target system 142 using local controller 110 and target controller 144. As will be described further below, local controller 110 and target controller 144 each include a network interface to provide out-of-band communications over network 132. While various embodiments of local controller 110 will be discussed herein, it will be understood that target controller 144 may be substantially similar to local controller 110.

Figure 2:
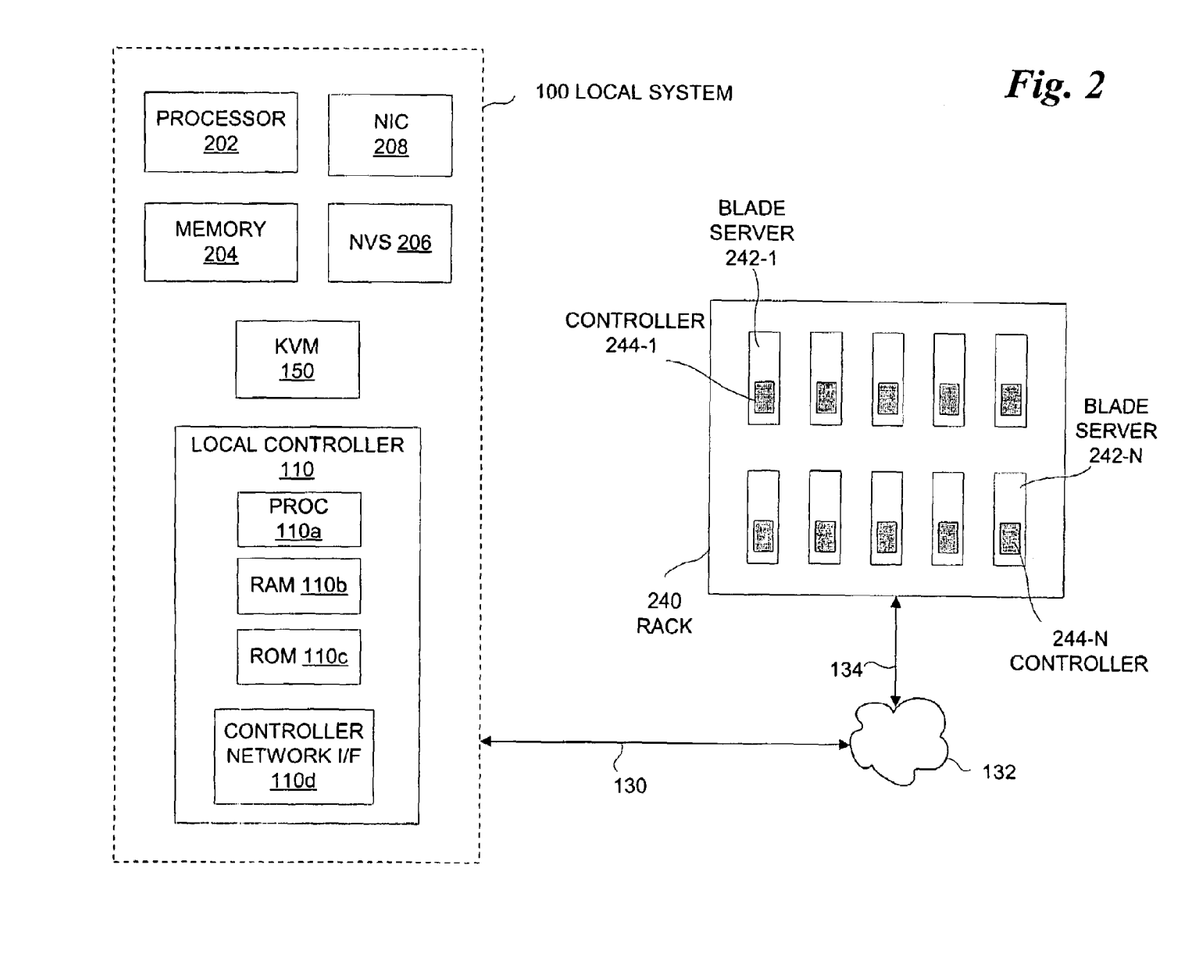
FIG. 2 is a block diagram illustrating one embodiment of an environment to provide a remote terminal capability in accordance with the teachings of the present invention.

Turning to FIG. 2, an embodiment of an environment to support providing remote terminal capability is shown. Local system 100 may include a processor 202, memory 204, a non-volatile storage (NVS) 206, a network interface card (NIC) 208, local controller 110, and KVM 150 operatively coupled by one or more busses (not shown). In one embodiment, processor 202 includes a central processing unit (CPU).

In one embodiment, NVS 206 includes a Flash memory device. In another embodiment, NVS 206 has stored a system Basic Input/Output System (BIOS) for local system 100. In yet another embodiment, NVS 206 has stored firmware instructions executable by local control 110 or executable by processor 202 to provide a remote terminal capability, as described herein.

In one embodiment, local controller 110 may include a processor 110a, a Random Access Memory (RAM) 110b, and an ROM 110c operatively coupled together by a bus (not shown). In one embodiment, ROM 110c has stored firmware instructions to support KVM functionality, as described herein. It will be understood that local controller 110 may include other types of non-volatile storage. In another embodiment, local controller 110 is integrated onto a motherboard of local system 100. In yet another embodiment, local controller 110 is part of an initiative to integrate intelligence into components to increase effectiveness of system management and applications.

In one embodiment, local controller 110 may include a controller network interface 110d for communicating over network 132. Controller network interface 110d provides a network connection distinct from the network connection available from NIC 208. In one embodiment, controller network interface 110d has a Media Access Control (MAC) address and an Internet Protocol (IP) address separate from the MAC and IP address of NIC 208. In another embodiment, the controller network interface 110d uses an Ethernet compatible connection (see, *Institute of Electrical and Electronic Engineers (IEEE) 802.3 Carrier Sense, Multiple Access with Collision Detection (CSMA/CD)*). In one embodiment, local controller 110 and target controller 144 communicate using the Internet Protocol (IP).

In one embodiment, local controller 110 may be initialized at the beginning of startup of the local system 100. In this particular embodiment, local controller 110 is initialized when processor 202 is initialized. Thus, local controller 110 may be available immediately after startup during the pre-boot phase of local system 100.

In another embodiment, local controller 110 is active during a standby power state, such as a sleep state, of local system 100. Thus, when local system 100 is awakened, local controller 110 is available immediately.

In one embodiment, controller network interface 110d may provide an out-of-band (OOB) manageability port for local system 100. Such a manageability port may be used by a system administrator to access and manage local system 100 over a network, such as an enterprise network. In one embodiment, controller 110 may serve as a LAN microcontroller.

In one embodiment, local controller 110 and its network capabilities are not known to the user, but local controller 110 may operate in the background during pre-boot and runtime phases of local system 100. In another embodiment, an operating system executing on local system 100 may be unaware of the presence of local controller 110 and the OS may be unaware of the interaction of local controller 110 with components of local system 100, such as memory 204.

Referring again to FIG. 2, local system 100 may be communicatively coupled to target systems over network 132. In the embodiment of FIG. 2, target systems include blade servers 242-1 to 242-N residing in a rack 240. In an alternative embodiment, blade servers 242-1 to 242-N correspond to servers 1-N residing in one or more server farms.

Each blade server 242-1 to 242-N includes a corresponding blade server controller 244-1 to 244-N. In one embodiment, the blade server controllers 244 are substantially similar to local controller 110. In another embodiment, blade server controllers 244 are integrated onto the main board of blade servers 242. While the embodiment of FIG. 2 shows each blade server 242 having a blade server controller 244, it will be understood that in other embodiments, not all systems in rack 240 include a controller.

Figure 3:
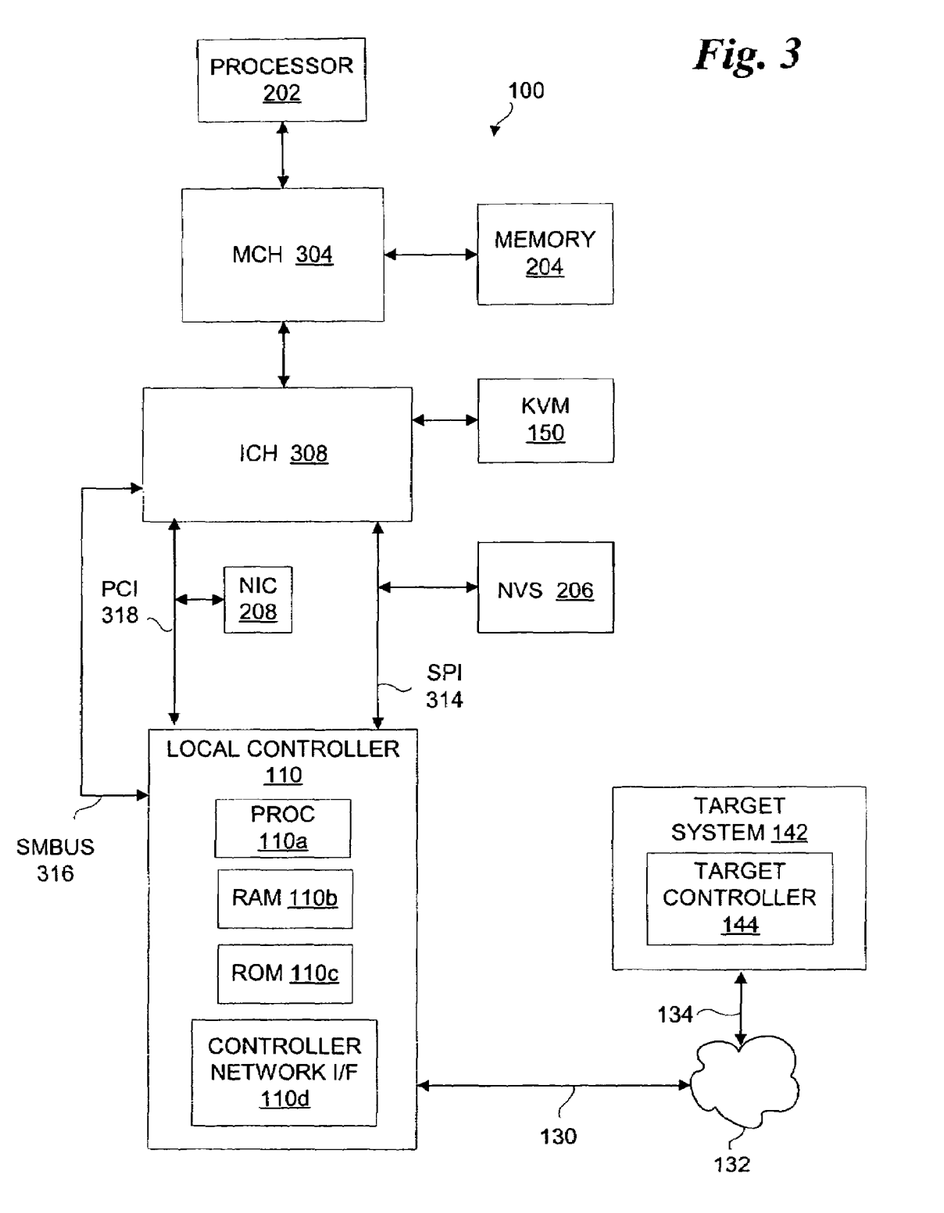
FIG. 3 is a block diagram illustrating one embodiment of an environment to provide a remote terminal capability in accordance with the teachings of the present invention.

Turning to FIG. 3, another embodiment of local system 100 is shown. Local system 100 may be communicatively coupled to target 142 over network 132, where target 142 includes target controller 144.

An Input/Output (I/O) Controller Hub (ICH) 308 is coupled to a Memory Controller Hub (MCH) 304. In one embodiment, ICH 308 serves as an I/O controller and MCH 304 serves as a memory controller.

Processor 202 and memory 204 may be coupled to MCH 304. KVM 150 may be coupled to ICH 308. Various devices (not shown), such as a magnetic disk drive, an optical disk drive, or the like, may also be coupled to ICH 308. In one embodiment, local system 100 includes a video card (not shown) coupled to an Accelerated Graphics Port (AGP) or Peripheral Component Interface (PCI) slot of local system 100 to support a video monitor of KVM 150; in another embodiment, support for the video monitor is integrated onto a motherboard of local system 100.

Local controller 110 is coupled to ICH 308. In one embodiment, local controller 110 may be coupled to ICH 308 via a System Management Bus (SMBUS) 316, a PCI bus 318, or a Serial Peripheral Interface (SPI) 314, or any combination thereof. In the embodiment of FIG. 3, NVS 206 is coupled to SPI 314 and NIC 208 is coupled to PCI bus 318. PCI bus 318 may include PCI-X, PCI Express, or the like.

In the embodiment of FIG. 3, local controller 110 has access to ICH 308 to allow local controller 110 to route KVM I/O traffic from KVM 150 and pass the traffic to target system 142 using controller network interface 110d. In turn, KVM I/O traffic received at interface 110d is passed to KVM 150 using ICH 308. In one embodiment, settings in local system 100, such as ICH 308 settings, are established which are sensitive to traffic at particular devices and/or ports. Once an action is triggered (for example, a keypress), a notification of the action is sent to local controller 110 and the associated data is pushed to the target system 142.

Figure 4:
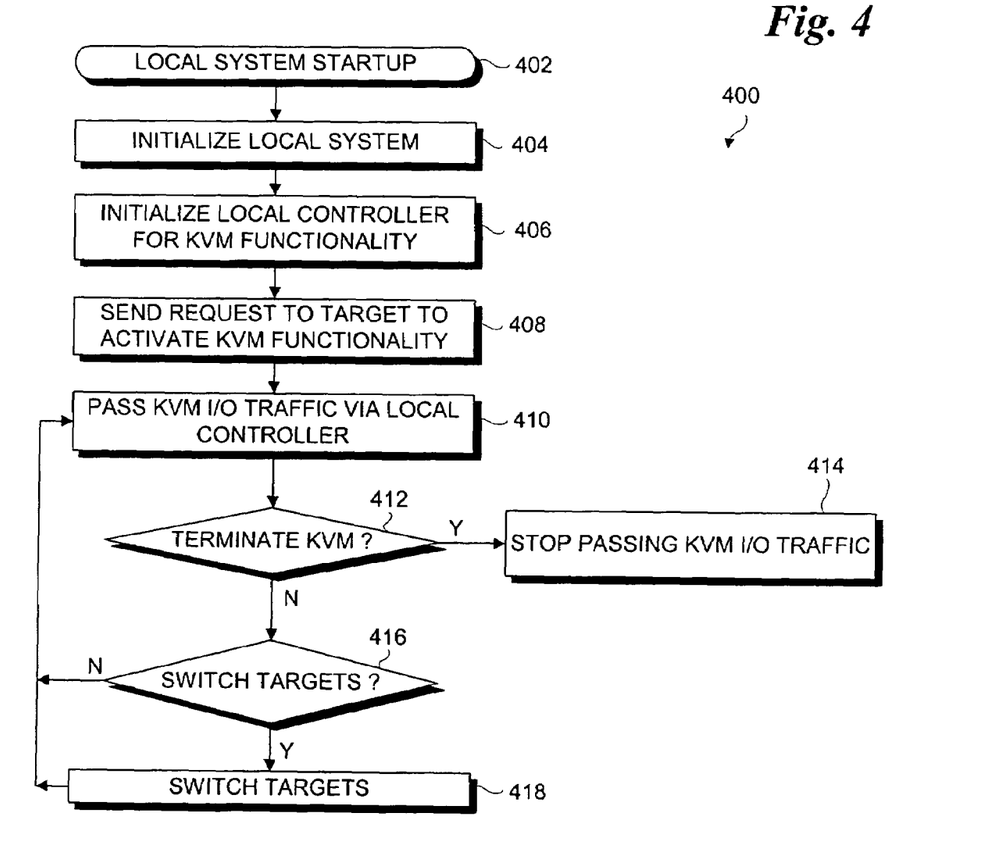
FIG. 4 is a flowchart illustrating one embodiment of the logic and operations to provide a remote terminal capability in accordance with the teachings of the present invention.

Turning to FIG. 4, a flowchart 400 illustrates one embodiment of the logic and operations to provide remote terminal capability from the perspective of the local system. Starting in a block 402, the local system is started/reset. Proceeding to a block 404, the local system is initialized. In one embodiment, a Power-On Self Test (POST) is performed on the local system. In another embodiment, firmware instructions, such as a system BIOS, are loaded from non-volatile storage and executed on the local system. In yet another embodiment, the local controller is initialized at startup and available to provide KVM functionality during the pre-boot phase of the local system.

Proceeding to a block 406, the local controller is initialized for KVM functionality. In one embodiment, ICH 308 settings are established to route KVM I/O traffic to the local controller and to route KVM I/O traffic received at the local controller to the appropriate KVM device.

Continuing to a block 408, a request is sent to the target system to request activation of KVM functionality at the target system. When the target system reports it is ready, KVM I/O traffic from the KVM of the local system is passed through the local controller to the target system, as depicted in a block 410. Thus, a user at the KVM may operate the target system remotely.

Proceeding to a decision block 412, the logic determines if the KVM session is to be terminated. If the answer to decision block 412 is yes, then the logic proceeds to a block 414 to stop passing KVM I/O traffic between the local system and the target system. If the answer to decision block 412 is no, then the logic continues to a decision block 416.

In decision block 416, the logic determines if the KVM is to switch targets. If the answer is no, then the logic returns to block 410. If the answer is yes, then the logic continues to a block 418 to switch targets. In one embodiment, switching targets includes terminating the KVM session with the first target and initializing a new KVM session with a new target system having a new target controller. In one embodiment, the first and second targets are blade servers coupled to the same blade server rack. After block 418, the logic returns to block 410 to pass KVM I/O traffic with the new target system via the local controller.

Figure 5:
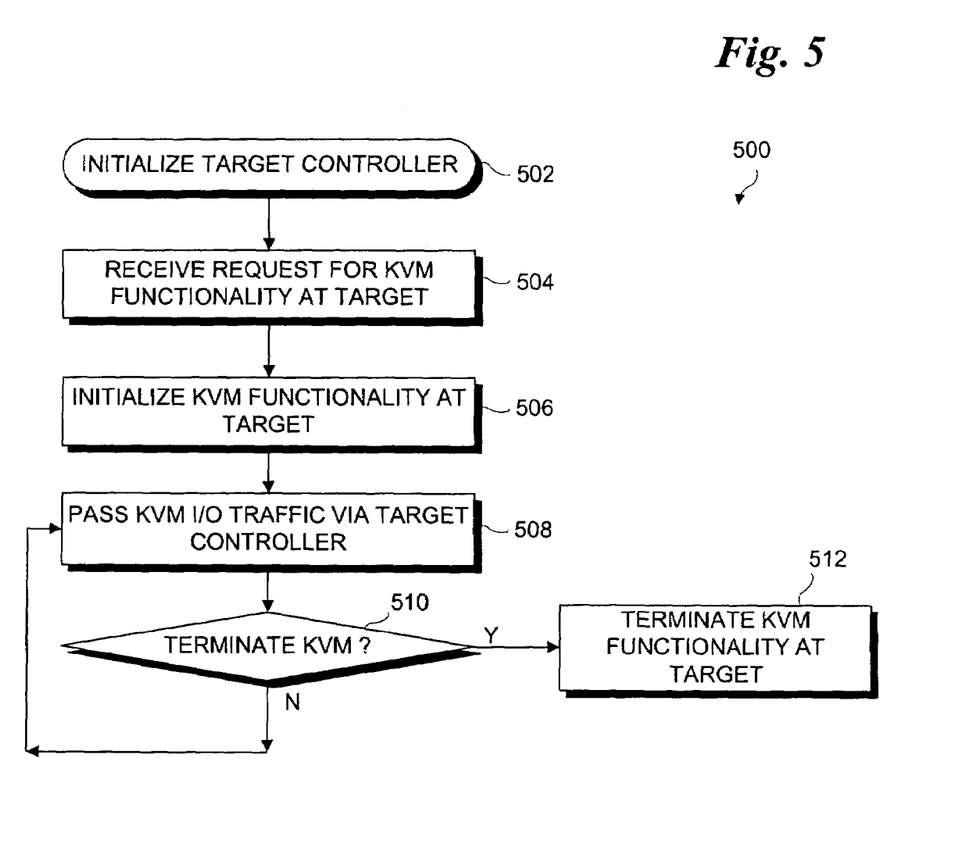
FIG. 5 is a flowchart illustrating one embodiment of the logic and operations to provide a remote terminal capability in accordance with the teachings of the present invention.

Turning to FIG. 5, a flowchart 500 illustrates one embodiment of the logic and operations to provide remote terminal capability from the perspective of the target system. Starting in a block 502, the target controller of the target system is initialized. Continuing to a block 504, the target system receives a request for KVM functionality to be enabled at the target system. Proceeding to a block 506, KVM functionality is initialized at the target system such that the KVM of a local system may interact with the target system. In one embodiment, initializing KVM functionality includes setting up the target system such that inputs from a target system keyboard and mouse are ignored. In this way, the target system will not be receiving competing KVM inputs. In one embodiment, a target system video monitor may mirror the video I/O sent to the local system.

Proceeding to a block 508, KVM I/O traffic is passed between the target system and the local system using the target controller. Moving to a decision block 510, the logic determines if the local system indicates that the KVM functionality is to be terminated. If the answer is no, then the logic returns to block 508.

If the answer to decision block 510 is yes, then the logic proceeds to a block 512 to terminate the KVM functionality at the target system. In one embodiment, the control of the keyboard, video, and mouse of the target system are returned to the target system.

Embodiments herein provide KVM functionality without the additional expense of purchasing numerous KVM Switches. Systems shipped with a controller as described herein may be used right out of the box to provide remote terminal capability. The time and expense to enable KVM functionality across a large number of platforms on a corporate network may be minimized.

Figure 6:
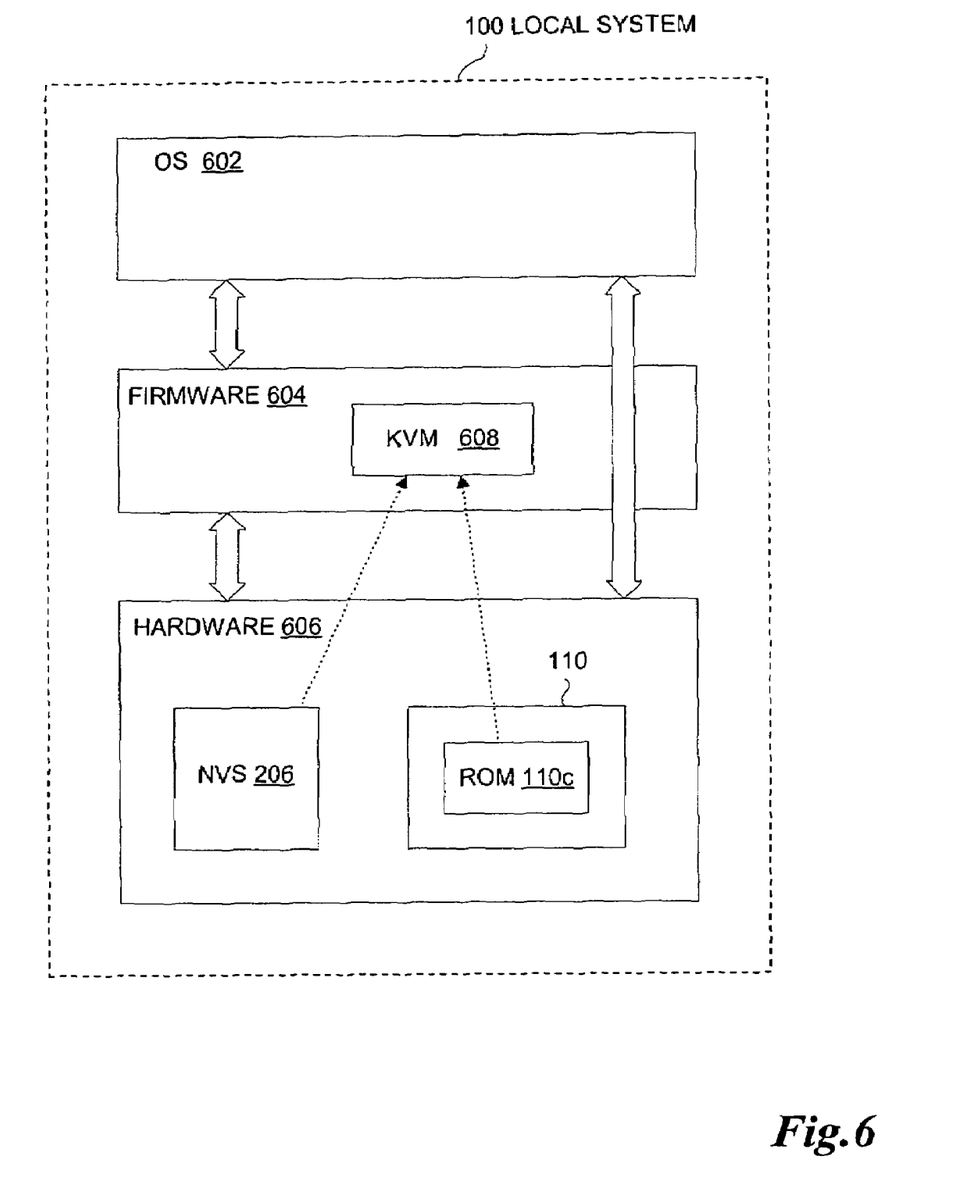
FIG. 6 is a block diagram illustrating one embodiment of a system architecture to provide a remote terminal capability in accordance with the teachings of the present invention.

Embodiments described herein to provide remote terminal capability may be considered "OS agnostic" as KVM functionality may not require any underlying OS support at the local system or at the target system. Referring to FIG. 6, an embodiment of an architecture for local system 100 is illustrated. Local system 100 includes an operating system 602 layered on firmware 604. Firmware 604 is layered on hardware 606. Firmware 604 includes KVM firmware instructions 608 to support KVM functionality during the pre-boot phase and OS runtime of the local system 100.

Generally, the pre-boot phase is defined as the period of time between the startup of local system 100 and OS 602 taking control of local system 100. During the pre-boot phase, firmware 604 is loaded from NVS 206. In one embodiment, firmware 604 includes a system BIOS for local system 100. Generally, firmware 604 initializes the hardware 606 and then loads and initiates OS 602. When the OS 602 takes control of local system 100, the period commonly known as OS runtime begins.

Firmware 604 may provide services to OS 602 during OS runtime. In one embodiment, such services include supporting interaction with hardware 606 and handling software interrupts. In the embodiment of FIG. 6, OS 602 may communicate directly with hardware 606. OS 602 may also request services from firmware 604 and firmware 604 subsequently interacts with the hardware 606. Additionally, the firmware 604 may initiate a transaction with hardware 606 without prompting from OS 602.

In one embodiment, firmware 604 and KVM firmware instructions 608 operate substantially in compliance with the Extensible Firmware Interface (EFI) (*Extensible Firmware Interface Specification*, Version 1.10, Dec. 1, 2002, available at http://developer.intel.com/technology/efi.) EFI enables firmware, in the form of firmware modules and drivers, to be loaded from a variety of different resources, including Flash memory devices, option ROMs (Read-Only Memory), other storage devices, such as hard disks, CD-ROM (Compact Disk-Read Only Memory), or from one or more computer systems over a computer network. One embodiment of an implementation of the EFI specification is described in the *Intel® Platform Innovation Framework for EFI Architecture Specification—Draft for Review*, Version 0.9, Sep. 16, 2003. It will be understood that embodiments of the present invention are not limited to the "Framework" or implementations in compliance with the EFI specification.

In one embodiment, KVM firmware instructions 608 are stored in NVS 206, ROM 110c, or any combination thereof. Since these firmware instructions may operate in the firmware layer 604 of local system 100, they are independent of an operating system. Thus, a platform Original Equipment Manufacture (OEM) may provide remote terminal capability without being attached to an OS-level software solution, such as Windows® Remote Terminal. It will be understood that KVM functionality at a target system may also operate from the firmware environment of the target system.

Embodiments herein allow KVM functionality to occur during the pre-boot phases or the OS runtime phases of the local system and the target system. One or more events of flowchart 400 may occur in the pre-boot phase, the OS runtime phase, or any combination thereof, of the local system. One or more events of flowchart 500 may occur in the pre-boot phase, the OS runtime phase, or any combination thereof, of the target system. In some embodiments, KVM functionality may occur while the local system is in pre-boot and the target system is in OS runtime, the local system is in OS runtime and the target system is in pre-boot, both systems are in pre-boot, or both systems are in OS runtime.

In one embodiment, a terminal emulator may execute at the local system to present KVM I/O traffic to a user at the local system. In one embodiment, local system firmware stored in NVS 206 may include a terminal emulator to provide remote terminal support at the local system. In one embodiment, the terminal emulator includes a pre-boot utility, such as an EFI application. In another embodiment, the local controller may include firmware instructions stored in ROM 110c to provide a terminal emulator at the local system. In one embodiment, the terminal emulator operates from firmware 604 of local system 100.

Further, embodiments of KVM functionality as described herein may be used to satisfy operating systems that require the presence of a KVM. A local controller and target controller working in the background may give an OS on the target system the illusion that the target system has an attached KVM. Thus, a corporation may use rack-mounted server deployments without the additional expense of purchasing truly headless OSs.

Figure 7:
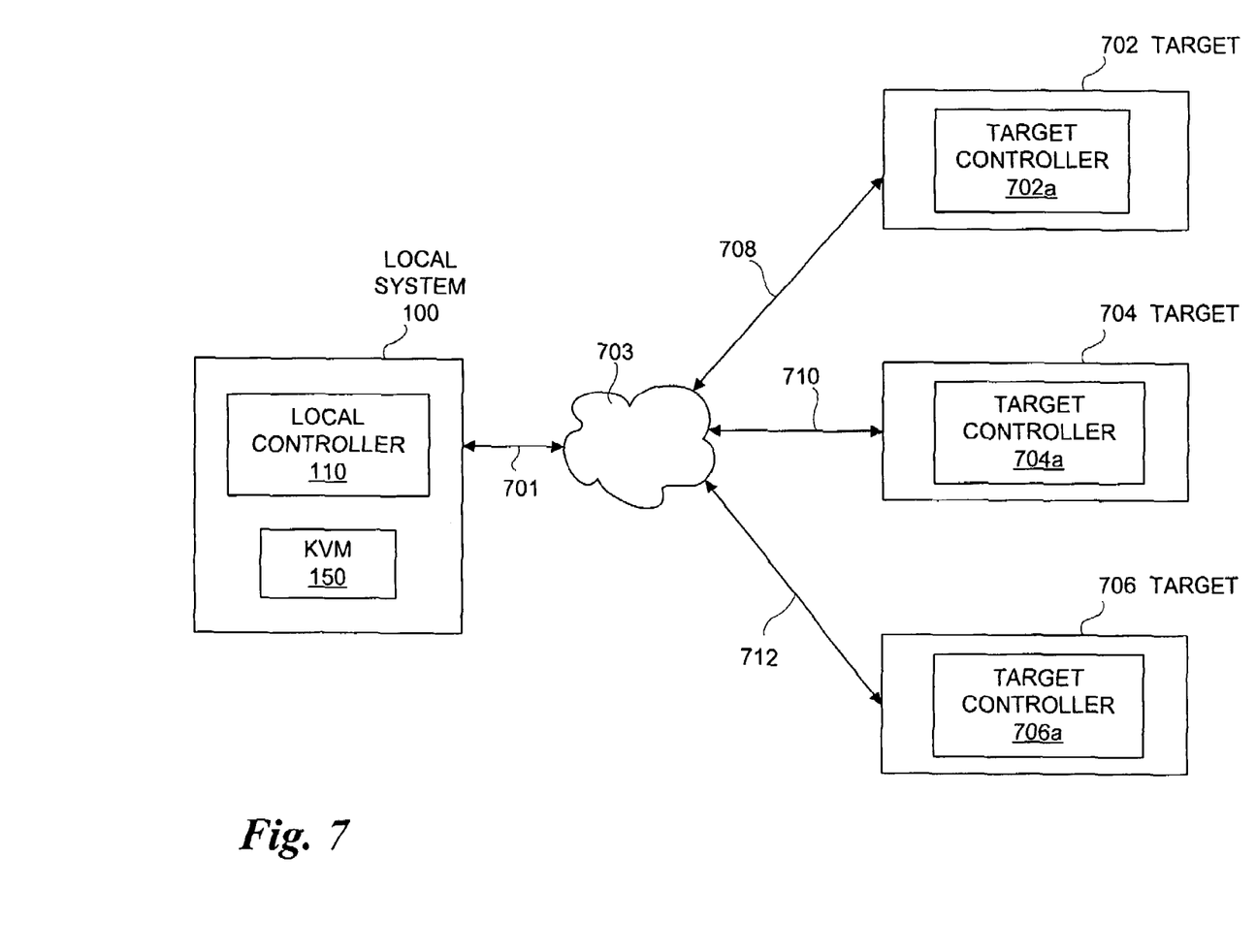
FIG. 7 is a block diagram illustrating one embodiment of an environment to provide a remote terminal capability in accordance with the teachings of the present invention.

Referring to FIG. 7, an embodiment of an environment to support providing remote terminal functionality is shown. Local system 100 includes local controller 110 and KVM 150. Local system is communicatively coupled to a network 703 via connection 701.

FIG. 7 also shows a target system 702 including a target controller 702a, target system 704 including a target controller 704a, and target system 706 including a target controller 706a. Target systems 702, 704, and 706, are communicatively coupled to network 703 by connections 708, 710, and 712 respectively.

In one embodiment, a user at local system 100 may use embodiments described herein to remotely operate target system 702 using local controller 110 and target controller 702a. The user may switch from target system 702 to target system 704 or target system 706. Target systems 702, 704, 706 may reside within the same intranet or on different networks accessible over the Internet. Thus, the I/O traffic of KVM 150 may be routed to a myriad of platforms that physically reside in the same room as the KVM user or spread across the globe.

Embodiments described herein may be used to support a network meeting. Referring to FIG. 7, assume users sitting at local system 100 and target systems 702, 704, and 706 are conducting a meeting. KVM 150 may be used to operate target system 702a. In one embodiment, KVM I/O traffic is passed between local system 100 and target system 702, while video I/O of the KVM I/O traffic is passed between target system 702 and target systems 704 and 706. Thus, the video I/O traffic is passed to multiple systems, while the complete KVM I/O traffic is passed between local system 100 and target system 702. In another embodiment, all of the KVM I/O traffic is passed to target systems 704 and 706.

In one embodiment, this network meeting may be accomplished without support from an operating system. The KVM functionality may be provided by local controller 110 and target controllers 702a, 704a and 706a. In one embodiment, the instructions to support the network meeting may be stored as firmware on local controller 110 and target controllers 702a, 704a and 706a. In another embodiment, network meeting firmware instructions are stored in NVS of local system 100 and target systems 702, 704, and 706. A network meeting may occur during pre-boot or OS runtime of any of the participating systems.

Figure 8:
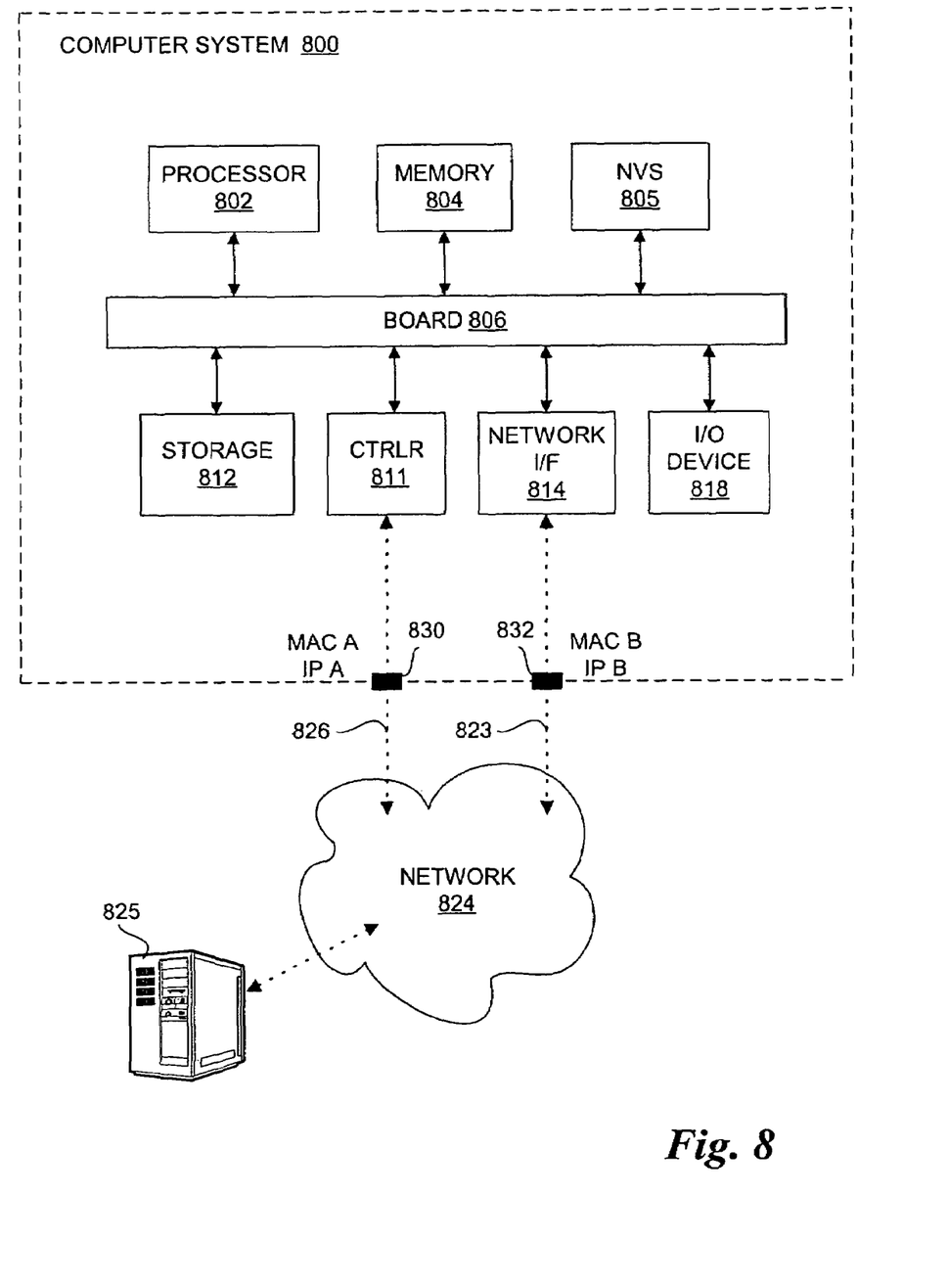
FIG. 8 is a block diagram illustrating one embodiment of a computer system to implement embodiments of the present invention.

FIG. 8 is an illustration of one embodiment of an example computer system 800 on which embodiments of the present invention may be implemented. Computer system 800 includes a processor 802 and a memory 804 coupled to a board 806. Storage 812, non-volatile storage (NVS) 805, network interface 814, and Input/Output (I/O) device 818 may also be coupled to board 806. Embodiments of computer system 800 include, but are not limited to a desktop computer, a notebook computer, a server, a personal digital assistant, a network workstation, or the like.

Processor 802 may include, but is not limited to, an Intel Corporation x86, Pentium®, Xeon®, or Itanium® family processor, a Motorola family processor, or the like. In one embodiment, computer system 800 may include multiple processors. Memory 804 may include, but is not limited to, Dynamic Random Access Memory (DRAM), Static Random Access Memory (SRAM), Synchronized Dynamic Random Access Memory (SDRAM), Rambus Dynamic Random Access Memory (RDRAM), or the like.

Board 806 may include a Memory Controller Hub (MCH), an Input/Output Controller Hub (ICH), or the like. In one embodiment, board 806 may include a motherboard of computer system 800. Board 806 may also include a Peripheral Component Interconnect (PCI) bus, a System Management Bus (SMBUS), a Low Pin Count (LPC) bus, a Serial Peripheral Interface (SPI) bus, or the like. I/O device 818 may include a keyboard, a mouse, a video monitor, a printer, a scanner, or the like.

The computer system 800 may interface to external systems through network interface 814. Network interface 814 may include, but is not limited to, a modem, a network interface card (NIC), or other interfaces for coupling a computer system to other computer systems. A carrier wave signal 823 is received/transmitted by network interface 814. In the embodiment illustrated in FIG. 8, carrier wave signal 823 is used to interface computer system 800 with a network 824, such as a local area network (LAN), a wide area network (WAN), the Internet, or any combination thereof. In one embodiment, network 824 is further coupled to a computer system 825 such that computer system 800 and computer system 825 may communicate over network 824.

Computer system 800 may also include a controller 811 coupled to board 806. In one embodiment, controller 811 is integrated onto board 806. Controller 811 may be used to provide computer system 800 with remote terminal capability with computer system 825, in accordance with embodiments described herein. Controller 811 may communicate with network 824 using a carrier wave signal 826. In one embodiment, computer system 825 may include a controller (not shown) substantially similar to controller 811 that may be used to communicatively couple computer system 825 to computer system 800 via network 824.

In one embodiment, controller 811 is coupled to a port 830 having MAC address A and IP address A, and network interface 814 is coupled to a port 832 having MAC address B and IP address B. In this particular embodiment, computer system 800 is viewed by the network 824 as two distinct nodes. In one embodiment, controller 811 and port 830 serve as an OOB channel for management and control information.

The computer system 800 also includes NVS 805 on which firmware and/or data may be stored. Non-volatile storage devices include, but are not limited to, Read-Only Memory (ROM), Flash memory, Erasable Programmable Read Only Memory (EPROM), Electronically Erasable Programmable Read Only Memory (EEPROM), Non-Volatile Random Access Memory (NVRAM), or the like. Storage 812 includes, but is not limited to, a magnetic hard disk, a magnetic tape, an optical disk, or the like. It is appreciated that instructions executable by processor 802 may reside in storage 812, memory 804, NVS 805, controller 811, or may be transmitted or received via network interface 814 or controller 811.

For the purposes of the specification, a machine-accessible medium includes any mechanism that provides (i.e., stores and/or transmits) information in a form readable or accessible by a machine (e.g., a computer, network device, personal digital assistant, manufacturing tool, any device with a set of one or more processors, etc.). For example, a machine-accessible medium includes, but is not limited to, recordable/non-recordable media (e.g., read only memory (ROM), random access memory (RAM), magnetic disk storage media, optical storage media, a flash memory device, etc.).

It will be appreciated that in one embodiment, computer system 800 may execute operating system software. For example, one embodiment of the present invention utilizes Microsoft Windows® as the operating system for computer system 800. Other operating systems that may also be used with computer system 800 include, but are not limited to, the Apple Macintosh operating system, the Linux operating system, the Unix operating system, or the like.

The above description of illustrated embodiments of the invention, including what is described in the Abstract, is not intended to be exhaustive or to limit the embodiments to the precise forms disclosed. While specific embodiments of, and examples for, the invention are described herein for illustrative purposes, various equivalent modifications are possible, as those skilled in the relevant art will recognize. These modifications can be made to embodiments of the invention in light of the above detailed description.

The terms used in the following claims should not be construed to limit the invention to the specific embodiments disclosed in the specification. Rather, the following claims are to be construed in accordance with established doctrines of claim interpretation.

What is claimed is:

1. A method comprising:
    initializing a local system, the local system including a Keyboard-Video-Mouse (KVM) coupled to a local controller and to a network interface card ("NIC"), the NIC having a first network address and the local controller having a second network address;
    initializing the local controller for KVM flunctionality, wherein the local controller is integrated on a motherboard of the local system and coupled internally within the local system to an input/output ("I/O") controller of the local system;
    sending a request to a target system to activate KVM functionality at the target system, the target system communicatively coupled to the local system; and
    passing KYM input/output (I/O) traffic between the KVM and the target system via the local controller.

2. The method of claim 1 wherein the target system includes a target controller, the target system passing the KVM I/O traffic via the target controller.

3. The method of claim 1 wherein the local system and the target system each include a non-volatile storage having stored firmware instructions to support the KVM functionality.

4. The method of claim 1 wherein the passing KVM I/O traffic between the KVM and the target system occurs without operating system support executing on the local system.

5. The method of claim 1 wherein the passing KVM I/O traffic includes passing KVM I/O traffic during a pre-boot phase of the local system.

6. The method of claim 1 wherein the passing KVM I/O traffic includes passing KVM I/O traffic during a pre-boot phase of the target system.

7. The method of claim 1, further comprising ignoring input from a target system keyboard and a target system mouse coupled to the target system while passing KVM I/O traffic between the KYM and the target system.

8. The method of claim 1, further comprising providing a terminal emulator at the local system to support the KVM functionality.

9. The method of claim 1, further comprising switching from the target system to a second target system to pass the KVM I/O traffic via a second target controller of the second target system, the second target controller communicatively coupled to the local system.

10. The method of claim 1, further comprising passing at least a portion of the KVM I/O traffic between the target system and a second target system communicatively coupled to the target system, wherein the second target system includes a second target controller, the second target system passing the at least a portion of the KVM I/O traffic via the second target controller.

11. An article of manufacture comprising:
    a tangible machine-accessible medium including a plurality of instructions which when executed perform operations comprising:
    initializing a local controller at a local system for Keyboard-Video-Mouse (KVM) functionality, the local system including a KVM, the local controller, and a network interface card ("NIC"), wherein the local controller is integrated on a motherboard of the local system and coupled internally within the local system to an input/output ("I/O") controller of the local system, wherein the NIC is assigned a first network address and the local controller is assigned a second network address;
    establishing a network connection with a target controller of a target system using the local controller; and
    passing KVM input/output (I/O) traffic between the KVM and the target system via the local controller and the target controller.

12. The article of manufacture of claim 11 wherein the tangible machine-accessible medium includes a non-volatile storage.

13. The article of manufacture of claim 11 wherein the passing KVM I/O traffic occurs without support from an operating system executing on the local system.

14. The article of manufacture of claim 11 wherein the passing KVM I/O traffic includes passing KVM I/O traffic during a pre-boot phase of the local system.

15. The article of manufacture of claim 11 wherein execution of the plurality of instructions further performs operations comprising providing a terminal emulator at the local system to support the KVM.

16. The article of manufacture of claim 11 wherein execution of the plurality of instructions further performs operations comprising switching from the target system to a second target system to pass the KVM I/O traffic via a second target controller of the second target system, the second target controller communicatively coupled to the local system.

17. A computer system, comprising;
    a Keyboard-Video-Mouse (KVM);
    a video card operatively coupled to a video monitor of the KVM;
    a local controller operatively coupled to the KVM, the local controller integrated on a motherboard of the computer system and coupled internally within the computer system to an input/output ("I/O") controller of the computer system, the local controller including:
    a processor;
    a local controller network interface operatively coupled to the processor; and
    a non-volatile storage (NVS) operatively coupled to the processor, the NVS including firmware instructions which when executed by the processor perform operations comprising:
        initializing the local controller for KVM functionality
        sending a request to a target system to active KVM functionality at the target system, the target system communicatively coupled to the computer system via the local controller network interface; and
        passing KVM input/output (I/O) traffic between the KVM and the target system via the local controller network interface; and a network interface card (NIC) operatively coupled to the KVM, the NIC to have a first network address and the local controller to have a second network address.

18. The computer system of claim 17 wherein the target system includes a target controller, the target system to pass the KVM I/O traffic via the target controller.

19. The computer system of claim 17 wherein passing KVM I/O traffic between the KVM and the target system occurs without support from an operating system executable by the computer system.

20. The computer system of claim 17, further comprising a central processing unit (CPU) operatively coupled to the local controller, the CPU and the local controller integrated onto the same board.

21. The computer system of claim 17 wherein the passing KVM I/O traffic includes passing KVM I/O traffic during a pro-boot phase of the computer system.

22. A method, comprising:
receiving a request for Keyboard-Video-Mouse (KVM) functionality from a local system at a target system, wherein the target system includes a target controller and a target network interface card ("NIC") both operative coupled to the KVM, wherein the target controller is integrated on a motherboard of the target system and coupled internally within the target system to an input/output ("I/O") controller of the target system;
assigning a first network address to the tract controller;
assigning a second network address to the NIC;
initializing KVM functionality at the target system; and
passing KVM I/O traffic between the target system and the local system via the target controller.

23. The method of claim 22 wherein initializing KVM functionality includes ignoring input from a target system keyboard and a target system mouse coupled to the target system while passing KVM I/O traffic at the target system.

24. The method of claim 22 wherein the passing KVM I/O traffic includes passing KVM I/O traffic during a pro-boot phase of the target system.

25. The method of claim 22 wherein KVM functionality at the target system Occurs without support of an operating system executing on the target system.

26. The method of claim 22 wherein the target system includes a nonvolatile storage having stored firmware to support KVM functionality at the target system.

* * * * *

UNITED STATES PATENT AND TRADEMARK OFFICE
CERTIFICATE OF CORRECTION

PATENT NO. : 7,426,542 B2 Page 1 of 1
APPLICATION NO. : 10/879321
DATED : September 16, 2008
INVENTOR(S) : Rothman et al.

It is certified that error appears in the above-identified patent and that said Letters Patent is hereby corrected as shown below:

In column 8, at line 48, delete "andlor" and insert --and/or--.

In column 11, at line 17, delete "pro-boot" and insert --pre-boot--.

Signed and Sealed this

Sixteenth Day of December, 2008

JON W. DUDAS
*Director of the United States Patent and Trademark Office*